United States Patent
Mercer

(10) Patent No.: US 7,161,968 B2
(45) Date of Patent: Jan. 9, 2007

(54) LASER APPARATUS

(75) Inventor: Ian P. Mercer, Keymer (GB)

(73) Assignee: Powerlase Limited (GB)

( * ) Notice: Subject to any disclaimer, the term of this patent is extended or adjusted under 35 U.S.C. 154(b) by 74 days.

(21) Appl. No.: 10/484,118

(22) PCT Filed: Jul. 19, 2002

(86) PCT No.: PCT/GB02/03321

§ 371 (c)(1),
(2), (4) Date: Jun. 29, 2004

(87) PCT Pub. No.: WO03/009439

PCT Pub. Date: Jan. 30, 2003

(65) Prior Publication Data

US 2004/0240500 A1    Dec. 2, 2004

(30) Foreign Application Priority Data

Jul. 20, 2001    (GB) ................... 0117789.8

(51) Int. Cl.
*H01S 3/14*    (2006.01)
*H01S 3/20*    (2006.01)

(52) U.S. Cl. .......................... 372/39; 372/54

(58) Field of Classification Search ............ 372/39
See application file for complete search history.

(56) References Cited

U.S. PATENT DOCUMENTS

| 3,753,145 | A | * | 8/1973 | Chesler ................. 372/75 |
| 5,307,365 | A | * | 4/1994 | Stappaerts et al. ........ 372/72 |
| 5,400,353 | A | * | 3/1995 | Walpole et al. ........ 372/46.01 |
| 5,569,399 | A | | 10/1996 | Penney et al. |
| 5,936,984 | A | | 8/1999 | Meissner et al. |
| 6,039,632 | A | | 3/2000 | Robertson |
| 6,134,258 | A | * | 10/2000 | Tulloch et al. ............. 372/99 |
| 6,160,934 | A | | 12/2000 | Beach et al. |
| 6,418,156 | B1 | | 7/2002 | Peressini |
| 6,430,207 | B1 | * | 8/2002 | Alphonse ................. 372/98 |

FOREIGN PATENT DOCUMENTS

| JP | 61287287 | | 12/1986 |
| JP | 63211779 | * | 9/1987 |
| JP | 63211779 | | 9/1988 |
| WO | WO01/24325 | | 4/2001 |

* cited by examiner

*Primary Examiner*—Armando Rodriguez
(74) *Attorney, Agent, or Firm*—Reinhart Boerner Van Deuren s.c.

(57) ABSTRACT

In a solid state, optically end-pumped laser, the laser gain medium has a tapered diameter to minimize the maximum path length of barrelling amplified stimulated emission (ASE), and a roughened surface region at one end to scatter barrelling ASE out of the gain medium; thereby minimizing the negative effective of barrelling ASE's, and inhibiting the trapping of rays with a large longitudinal component, but disallowing a cyclic, i.e. repeated, pass path with specular reflections.

19 Claims, 2 Drawing Sheets

LASER APPARATUS

BACKGROUND OF THE INVENTION

Field of the Invention

The present invention relates to a laser apparatus, and in particular, to an optically pumped solid state laser.

Prior art lasers have used lateral pumping means, such as side-mounted solid state laser diode arrays, that direct pumping radiation to a side of an elongate gain medium for example a laser rod or slab. The sides of the rod are conventionally roughened or otherwise treated to inhibit specular, i.e. mirror-like, reflection and refraction, and introduce diffuse scattering. As a result pumping radiation is distributed evenly and efficiently in the gain medium, and parasitic lasing action is inhibited.

To further improve the efficiency, power, beam homogeneity and simplicity of head design for certain lasers, "end pumping" has been developed in which pumping radiation is guided towards one or both ends of an elongate gain medium such as a laser rod. The rod barrel surface is polished, to enable the end pumped radiation to propagate down the rod by total internal reflection (TIR).

Although necessary for the propagation of end pumped radiation, polishing introduces a significant disadvantage: polished rod barrels are susceptible to parasitic oscillation in which laser radiation sees overall gain for rays that propagate under total internal reflection, either propagating along the longitudinal axis, or about the longitudinal axis with a spiralling (or barrelling) component. This parasitic action can greatly reduce the efficiency of transfer of pump energy to the desired light beam, by depleting the energy stored.

To reduce the negative effect of parasitic stored energy depletion, flanged rod end pieces or caps have been used, as in Meissner (U.S. Pat. No. 5,936,984). The end pieces are intended to limit parasitic rays to one pass through the barrel, ejecting out of the rod rays that could otherwise experience continued total internal reflection by decreasing the angle of incidence of the ray impinging on the end face. However, limiting the ray path to one pass down the rod can still allow long path lengths for modes with a high barrelling component, resulting in depletion of stored energy in the laser rod. Indeed, use of rods with flanged ends still permits barrelling paths with, in principle, infinite length. In order to achieve significant removal of barrelling rays with a prior art polished, flanged end, the flange must be gradual and there must be a sufficient increase in diameter.

Beach in PCT International Publication No. WO 01/24325 A1 discloses the use of a rod with a tapered diameter, in conjunction with flanged ends. The combination of flanged end pieces and a tapered diameter limits the maximum ray path that can be trapped within a laser rod. The taper introduces an increasing longitudinal component to a light ray, even for the case of initial pure barrelling rays. The ray can then be ejected with a flanged rod end. Parasitic light rays are therefore prevented from experiencing extended path lengths in the laser rod and significantly depleting stored energy. The flanged region can also be designed such that rays without a barrelling component are also ejected from the gain medium.

Although use of a tapered rod with flanged ends has been successfully applied for some applications, use of flanged rod ends can be disadvantageous. For example, the design of the flange impacts on the ability to eject rays, and as such, the design of the gain medium can not be optimized with consideration given purely to coolant flow. The end cap diameters have to be dimensioned large enough relative to the rod diameter, and the flange curvature must remain moderate if barrelling rays are to be ejected requiring lengthening of the gain medium disadvantageously. Even then, specular (Fresnel) reflections may return rays that have originated from a large path length of barrelling action, with enough reflectivity to result in significant stored energy depletion. Further, flanged rod ends polished to enable efficient specular reflection of pump radiation and rejection of barrelling light rays are more complex to manufacture in comparison to a straight roughened rod end.

SUMMARY OF THE INVENTION

According to the present invention, there is provided a laser, comprising: a laser gain medium including first and second ends on a laser extraction axis and having a specularly reflecting surface between the ends; and a pump radiation source to direct pumping radiation into the gain medium, wherein the specularly reflecting surface has a diffusely scattering surface region. The medium may be elongate with a circular cross section, or may have a square, rectangular or elliptical cross section.

The present invention offers several advantages over the prior art. The diffusely scattering region, which may be a diffusely reflecting region inhibits or frustrates specular reflection and may comprise a roughened region or a patterned region comprising at least one of grooves, cross hatching, grinding with a preferential axis of symmetry and dimples. This region acts to increase the radial component of rays such that they are either transmitted through the sides of the rod, or scattered to an angle beyond the total internal reflection threshold for the polished end face, such that they exit the medium.

The diffusely scattering surface region is preferably at one of the gain medium ends. The pump radiation source preferably end pumps the laser gain medium. The medium preferably has a taper extending between its ends. The combination of a tapered diameter and the roughened region results in a reduction in the maximum trapped path length for rays ranging from longitudinal to rays with a large barrelling component. Barrelling rays are diverted by the taper along the medium.

This apparatus has the advantage that not only do rays exit via both the rod sides as well as the end face, but the apparatus can be designed such that no route exists for specular reflection of light propagating towards an end of the gain medium, back along the gain medium. The apparatus therefore minimizes the negative impact of parasitic oscillation, and requirements on manufacturing complexity are reduced, with no requirement for polished barrel sides with a defined longitudinal radius of curvature or flanges. The invention is thus both straight forward to manufacture and use; and allows the designer to optimize the laser design for other considerations such as coolant flow, and the overall length of the gain medium. Furthermore there is no need for addition to the length of the gain medium in order to accommodate a flanged region. As a result, the overall length of the gain medium can be reduced, with a resulting improvement in laser performance for high light intensity, pulsed applications. As the path length experienced by light passing through optical materials can be an important consideration for high intensity pulsed light propagation, minimization of this length is an advantage, improving robustness and in the quality of the pulsed light delivered in space or time.

For the present invention, the main benefit is experienced where the diffusely scattering region is provided at the rod end of largest diameter, however it can also be carried out at both ends, or between the ends with opportunity for improved performance. Although an increase in diameter at the rod ends can be an advantage for improving robustness by enabling a chamfer, and reducing the risk of stray light impinging on any coolant seal such as an O-ring, there is no requirement for an extended region, flanged to as large a relative diameter.

The specularly reflecting region is preferably polished.

Preferably, the longitudinal extent of the diffusely scattering region is such that an angle of incidence at an end face of the rod of radiation transmitted through the medium undergoing specular total internal reflection, is sufficiently less than the angle for total internal reflection from the polished end face, such that the radiation is predominantly lost from the medium. The longitudinal extent of the diffusely scattering region is therefore dependent on the refractive indices of the medium and surrounding media, but in typical applications such as for YAG side-cooled by water, may be expected to range in length between one and two diameters of the medium at the respective rod end, preferably approximately one diameter, where the roughened region is at the rod end.

Preferably, the medium tapers continuously from the first to the second end. Alternatively the medium may taper from a point intermediate to each of its ends. In one embodiment, the taper decreases from a maximum at both ends, to a minimum part way along the medium, or vice versa. The taper need not necessarily be linear, with the diameter varying proportionally with length but may be curved, and symmetric or asymmetric. The surface of the medium may graduate from the diffusely scattering region to the specularly reflecting region.

Preferably, both rod ends are of lower doping for the active laser species. This can be achieved by operatively connecting a lower or un-doped cap to one end of the medium employing a technique such as diffusion bonding or by growing, fusing or bonding with an agent. The rod ends may be increased in diameter to enable the addition of a chamfer (reducing the risk of chipping the laser material in handling) and to reduce the degree of exposure of any sealing material, such as an O-ring, to radiation. As discussed above, flanging is not compromised by the need for the configuration to accommodate the removal of parasitic radiation. The rod end may be of graduated doping for the active laser ion.

Preferably one or both ends of the gain medium have an optical coating to alter the reflection coefficient at normal incidence for either the pumping or lasing radiation, or both. The coating may be anti-reflective, or partially or totally reflecting.

According to a further aspect of the invention there is provided a laser gain medium including first and second ends on a laser emitting axis and having a specularly reflecting surface between the ends; wherein the specularly reflecting surface has a diffusely scattering surface region.

DESCRIPTION OF THE DRAWINGS

The present invention can be put into practice in several ways. A specific embodiment will now be described, by way of example, with reference to the accompanying drawings, in which:

FIG. 3b is an enlarged view of a detail of the rod shown in FIG. 3a;

FIG. 3c is a further enlarged view of a detail of the rod shown in FIG. 3a; and

DETAILED DESCRIPTION OF THE PREFERRED EMBODIMENT

Figure 1:
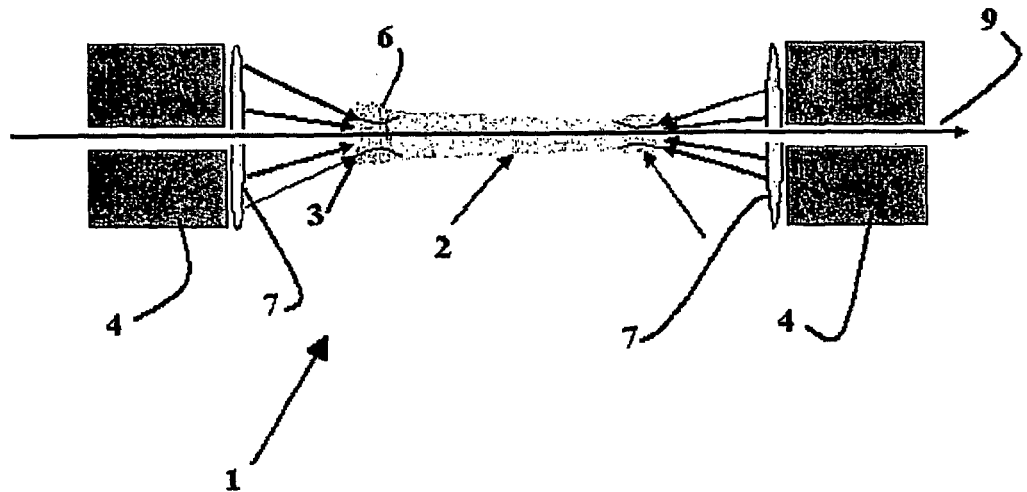
FIG. 1 is a schematic diagram of a laser gain medium and pumping means of the present invention.

FIG. 1 illustrates a laser 1 of the present invention. The laser includes a laser gain medium in the shape of a rod 2. The laser includes an array, or multiple arrays of solid state laser diodes 4 to emit pumping radiation to an end of the rod 2. The surface of the rod 2 is polished, which results in some of the amplified light adopting barrelling paths. The rod 2 includes a ground surface region 6 at one end, and a tapered diameter. The tapering reduces the maximum trapped path length of the barrelling rays by diverting them towards the rod's end face 3. Rays incident on the ground region are predominantly either scattered out of the rod to the side, or transmitted through the end face 3, thereby minimizing depletion of stored energy by the parasitic oscillation. The ground surface region is contiguous with, i.e. lies on, the same surface as the polished surface.

The component parts of the laser 1 will now be considered individually in more detail. Various diode materials can be applied as pumping means to achieve different diode lasing wavelengths, and for the preferred embodiment of pumping Yb:YAG at 940 nm, the diodes are typically constructed of InGaAs. The diodes emit pumping radiation to suit an excitation wavelength for the active laser ions in the gain medium. For gain media such as Yb:YAG, where the cross section for absorption is small (~$0.8 \times 10^{-20}$ cm$^2$), diodes are generally chosen at a wavelength of strong and broad bandwidth absorption at 941 nm, coupling energy most efficiently into laser output. The pumping light is focused with refractive or reflective optics, such as the lenses 7 shown, into one or both ends of the laser rod 2. The pumping power coupled in to each end is in excess of 100 W, typically 1–3 kW. In one embodiment a laser beam to be amplified 9 from a seed laser passes along the laser extraction axis, i.e. light transmitting axis, through a hole in the diode coupling optical components such as the diode arrays 4, lenses 7 and mirrors (not shown). Alternatively the system may rely on spontaneous emission in the gain medium without a source laser. In addition the rod ends are preferably coated with an optical coating to alter the reflection coefficient at normal incidence for either the pumping or lasing radiation, or both.

The laser includes a rod cooling system (not shown) of a longitudinal flow convection type, or an impingement cooling type, to counteract the thermal effects of the pumping radiation. An appropriate cooling system will be known to the skilled reader.

Preferably, the medium is based on Yb doping, the most common form being Yb:YAG. Alternatively, other Yb doped host materials such as KGW (KGd(WO$_4$)$_2$), KYW (KY(WO$_4$)$_2$), GGG, GdCOB, YLF and sesquioxides (Sc$_2$O$_3$, Y$_2$O$_3$, Lu$_2$O$_3$) may be used. Yb based materials lend themselves to an end pumping scheme due to either their low cross section for pump absorption (with the effective cross section for Yb:YAG being ~$0.8 \times 10^{-20}$ cm$^2$) or narrow absorption bandwidths (for example, the absorption bandwidth for Yb:KGW being around 3.7 nm at 981 nm). Either, or both of these two factors can result in a long absorption length for a doping level that would facilitate efficient laser action. Other gain materials such as Nd:YAG are also applicable, where the absorption length for pumping radiation is made sufficiently long to facilitate an efficient end pumping scheme. An end-pumped scheme is particularly advantageous for such materials, where output laser beam homogeneity, or simplicity of design for a laser head are high considerations. In one embodiment, the laser medium itself is made of yttrium aluminum garnet (YAG) doped with Ytterbium (Yb). The medium is typically rod shaped with a circular cross section. Typically, the rod is between 2 cm and 6 cm long, with an average diameter of 2 mm to 4 mm. Generally, however, the laser material may be crystalline, poly-crystalline, glass or ceramic, or other material.

The rod continuously tapers so that the diameter of the rod varies by a maximum of about 1 mm, from a maximum diameter at one end to a minimum diameter at the other. The taper value is chosen as a compromise between the advantages of reducing the longest trapped path length of parasitic rays, and optimizing the fractional volume in the laser rod that is accessible for extracting laser light. However the taper may alternatively be provided along a portion only of the rod, and may be a straight line or curved taper.

The rod surface is polished to provide a specularly reflecting surface confining the pumping radiation, and enabling it to propagate down the rod's barrel by total internal reflection. It will be noted that the beam can in fact be focussed in the gain material such that TIR is not the predominant guiding mechanism. At the large diameter end, a region of the radial surface (or "circumference") is roughened by grinding. The specific pattern may include a regular or irregular patterned surface, such as grooves, scratches, cross-hatching, dimples, or roughening with a preferential axis of symmetry (preferential scattering in one direction due to a directional finish to the grind) at the ends as an option, the key function being to either eject rays from the sides, or give a diffuse (non-specular) reflection, thus decreasing opportunity to TIR off end face. The roughening or ground region can make a gradual transition to the polished region rather than there being a sharp interface or step function, for example over a longitudinal extent corresponding approximately to the length of the fully ground region. Even where the pump radiation is focussed, the specular surface can still aid, helping to guide pump light that does focus completely.

The grinding size may be in the region 400–1200 grit and a preferred grinding size is 400 grit, however different specifications may be used for the optimum grinding, balancing scattering losses, and the integrity of the laser medium. Too large a grit size may result in micro-cracking which would weaken the material under stress loading from heat, however a larger grit size is likely to deliver greater loss of energy from the medium, for rays that are impinging on the side surface.

In the preferred embodiment the lateral extent of the ground region is chosen so that all rays passing to the end region of the rod are predominantly either transmitted through the end face, or scattered to an angle such that they exit the rod to the side. In other words, the lateral extent of the ground region is chosen so that any ray undergoing specular total internal reflection in the medium, on meeting the end face is incident at sufficiently less than the angle for total internal reflection off the (polished) end face, such that the rays in question predominantly exit the gain medium and parasitic lasing oscillation is suppressed. Highly barrelling rays impinge on the ground surface at the end region of the rod, and are predominantly removed by the action of scattering imparting a large radial component. A longer extent for the ground region can only reduce further the opportunity for daughter scattering rays to return to the gain medium, however the extent of the ground region must remain short enough such that pumping radiation does not impinge on the ground sides, resulting in pump loss and a reduction in efficiency of operation of the device. For typical high average power application, it is readily possible to operate with a roughened region of length equivalent to up to 2 rod diameters, without significant loss of pumping radiation with a lower limit in the region of one diameter. The roughened region may be located intermediate the ends of the rod, particularly in a side pumped configuration where the problem of pumping radiation loss would not arise. In this case the extent of the region might increase because of the lack of an end face imparting reflection symmetry.

Figure 2:
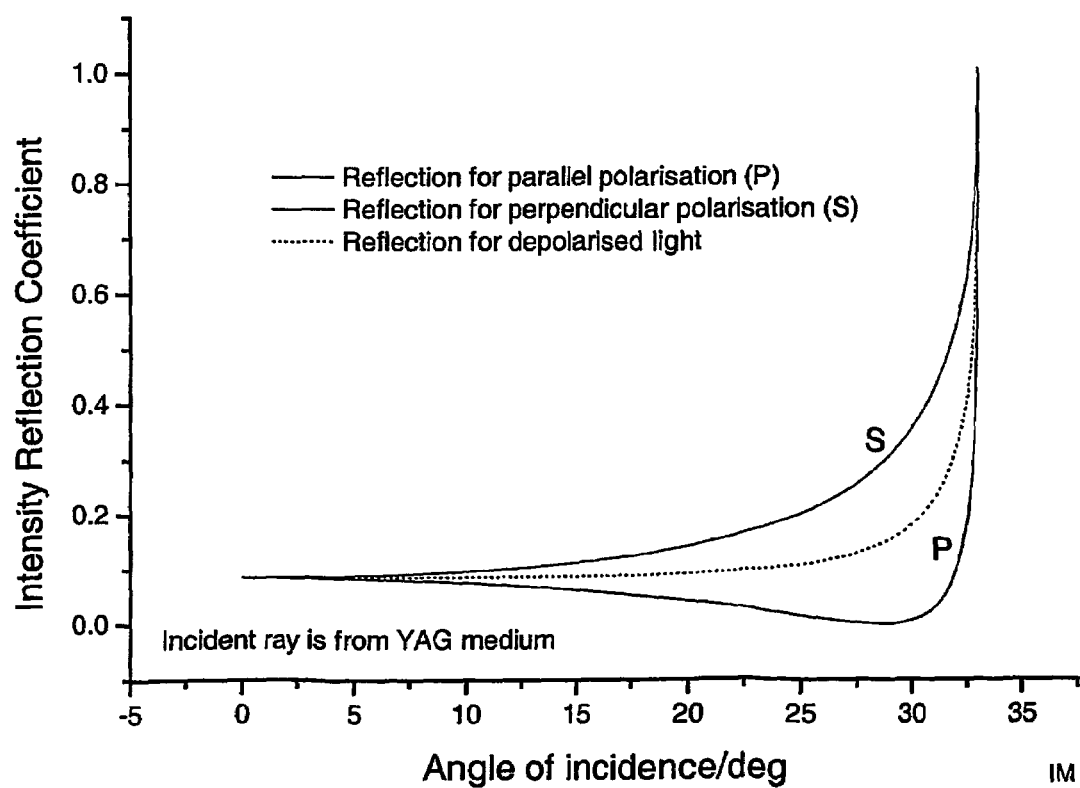
FIG. 2 is a graph of Fresnel reflection against incident angle for rays at a YAG-air interface.

FIG. 2 illustrates the internal Fresnel reflection against incident angle at the rod-air interface, showing the critical angle of incidence above which rays totally reflect. For a YAG-air interface, it can be seen that restricting the angle of incidence at the end face of the rod to less than 26°, reduces the reflection coefficient to less than 12%. Thus, for a typical application of YAG, to suppress specular reflection of a ray back in to the gain medium that experiences TIR, this corresponds to a ground length being approximately equal to the rod's diameter.

Figure 3A:
FIG. 3a is an illustration of the effect of a roughened rod surface region, on parasitic rays.
Figure 3B:
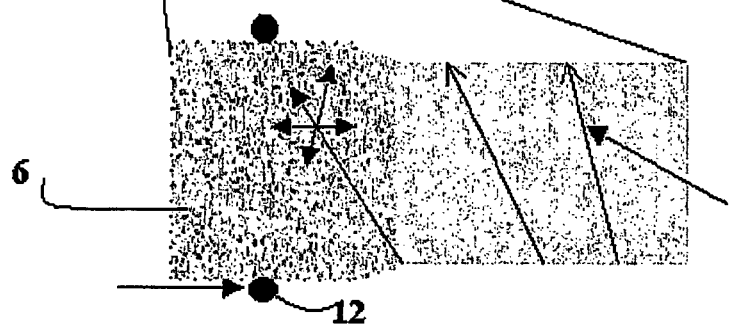
Figure 3C:
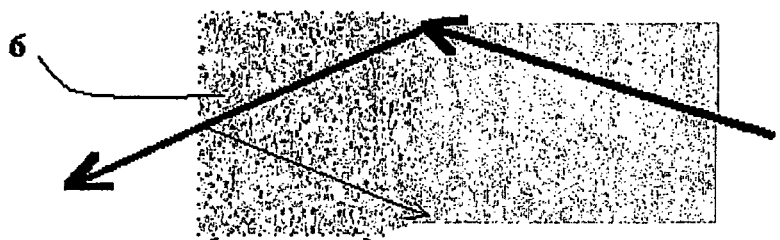

FIGS. 3a to 3c illustrate the effect of the ground region 6 on barrelling rays (shown as straight rays for simplicity). Barrelling rays are reflected towards the end of the rod, having had their path length minimized by tapering of the rod diameter (not shown). A barrelling ray with a long integrated path length has its radial component increased when impinging on the ground region 6, such that it either proceeds to exit the gain medium to the side, or if it reaches the end face, its angle of incidence is predominantly reduced to less than the angles of total internal reflection of the polished end face, the extent of the roughened region being such that any ray that can be supported by specular TIR in the medium meets the end face at an angle less than the TIR angle. The incident rays therefore predominantly exit the rod. The roughened region is provided at the larger diameter end; it can also be provided at the smaller diameter end although this is less critical for the continuous taper shown.

In the embodiment shown, the rod ends 6 include un-doped or partially doped end pieces or caps 14 that are polished, and in one embodiment a guiding duct is used to couple the pump light to the gain medium (not shown). Using a rod with ground ends, the end pieces only need to be typically 2 mm in length compared to typically 6 mm in length; for a 2 mm diameter YAG rod, with 4 mm diameter end caps. In the preferred embodiment, the rod ends include un-doped or partially or differently doped end caps which reduce damage at the ends as there is no heating, and further reduces losses in side pumped configurations. The end caps can be attached, bonded, grown or fused to the active laser medium. These may be generally dog-boned in shape. The dog-boned shaped ends allow for chamfering the ends of the rods without decreasing the optical aperture, and reduce the risk of exposure to radiation of sealing materials such as an O-ring 12, resulting in improved robustness.

Figure 4:
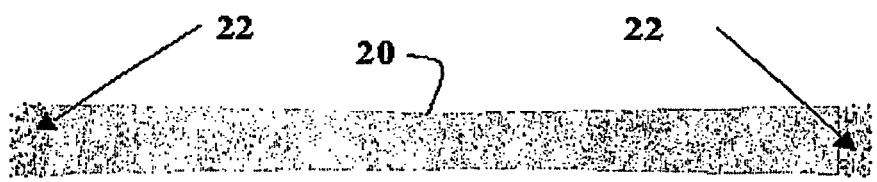
FIG. 4 is a side view of an alternative rod configuration.

FIG. 4 shows an alternative configuration in which the rod tapers from a central waist 20 to larger diameter ends 22, in which case both ends are preferably roughened to deplete parasitic laser action.

The cooling system may comprise a convection cooling system. Other embodiments use other cooling systems, such as impingement cooling or conduction cooling from side surfaces. The cooling can be applied around the elongated surfaces of the gain medium, to all sides (typical for the embodiment of a rod with fluid convection cooling), or to a restricted number of interfaces, or example in one embodiment to two sides of a slab-like elongated medium, and in another embodiment to one side of a slab-like elongated medium.

It will be understood to those skilled in the art that modifications to the invention are possible without departing from the scope of the invention. For example, any rod shape such as square, rectangular, polygonal or elliptical cross-section, or varying cross-section between two or more of these, or elongated slab-shape can be used. Similarly, any pumping configuration can be used that is consistent with the aims of the present invention, for example side pumping. The taper can run from the longitudinal center or other intermediate parts of the rod, outwards to the ends. The rod need not have a taper but only one or both ends roughened although this will not allow removal of highly barrelling parasitic rays.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

The invention claimed is:

1. A laser, comprising:
   a laser gain medium including first and second ends on a laser extraction axis and having a specularly reflecting surface region and a diffusely scattering surface region between the first and second ends; and
   a pump radiation source to direct pumping radiation into the laser gain medium; wherein at least a portion of the laser gain medium between the first and second ends is tapered.

2. A laser as defined in claim 1, wherein the diffusely scattering surface region is substantially located at either the first end or the second end of the laser gain medium.

3. A laser as defined in claim 1, wherein the pump radiation source end pumps the laser gain medium.

4. A laser as defined in claim 1, wherein the laser gain medium tapers continuously from the first end of the laser gain medium to the second end of the laser gain medium.

5. A laser as defined in claim 1, wherein the laser gain medium tapers from a point intermediate the first and second ends of the laser gain medium to each of the first and second ends of the laser gain medium.

6. A laser as defined in claim 1, wherein the diffusely scattering surface region comprises:
   a roughened region.

7. A laser as defined in claim 1, wherein the diffusely scattering surface region comprises:
   a patterned region.

8. A laser as defined in claim 7, wherein the patterned region comprises:
   at least one, of grooves, cross hatching, grinding with a preferential axis of symmetry, and dimples.

9. A laser as defined in claim 1, wherein the specularly reflecting surface region is polished.

10. A laser as defined in claim 1, wherein the surface of the laser gain medium graduates from the diffusely scattering surface region to the specularly reflecting surface region.

11. A laser as defined in claim 1, wherein a longitudinal extent of the diffusely scattering surface region is approximately equal to one to two diameters of the laser gain medium at the diffusely scattering surface region.

12. A laser as defined in claim 5, wherein the diffusely scattering surface region is at the end of the laser gain medium with the larger diameter.

13. A laser as defined in claim 1, wherein the laser gain medium is Yb doped.

14. A laser as defined in claim 1, wherein at least one of the first and second ends of the laser gain medium has an optical dielectric coating.

15. A laser gain medium including first and second ends on a laser emitting axis and having a specularly reflecting surface region and a diffusely scattering surface region between the first and second ends;
   wherein at least a portion of the laser gain medium between the first and second ends is tapered.

16. A laser as defined in claim 1, wherein the laser gain medium is elongate.

17. A laser, comprising:
   an elongate laser gain medium including first and second ends on a laser extraction axis, the laser gain medium having a polished specularly reflecting surface region and a roughened diffusely scattering surface region located between the first and second ends, wherein the laser gain medium has a tapered portion located between the first end and second ends of the laser gain medium; and
   a pump radiation source for directing pumping radiation into the laser gain medium to pump the laser gain.

18. A laser as defined in claim 17, wherein the laser gain medium comprises:
   a Yb doped medium.

19. A laser as defined in claim 17, wherein the diffusely scattering surface region comprises:
   a patterned region.

* * * * *